March 1, 1966  A. S. JOHNSON  3,237,940
SAFETY BRAKE CASTERS FOR WALKING AID
Filed Oct. 22, 1963
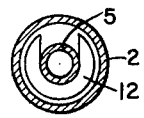
FIG.4.
FIG.1.
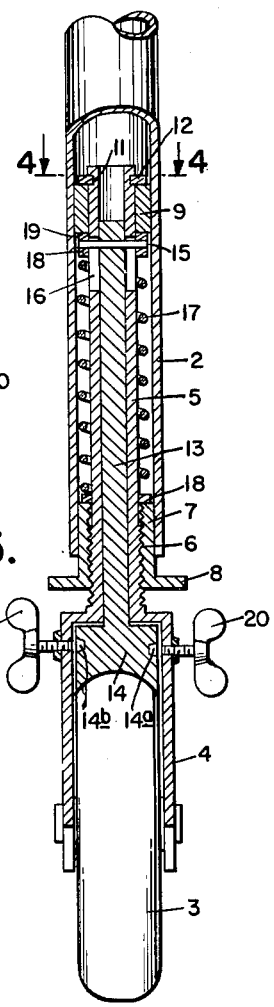
FIG.3.
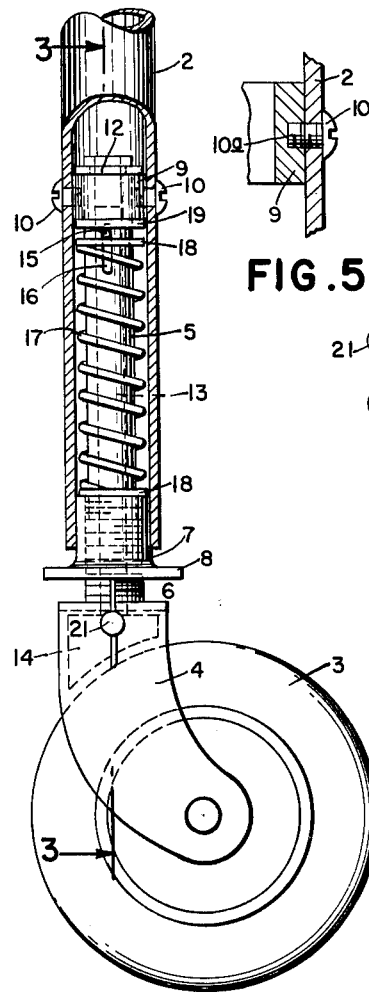
FIG.2.
FIG.5.
FIG.7.
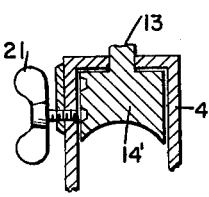
FIG.6.
INVENTOR
Auline S. Johnson
BY J. Hanson Boyden,
ATTORNEY

United States Patent Office 3,237,940
Patented Mar. 1, 1966

3,237,940
SAFETY BRAKE CASTERS FOR WALKING AID
Auline S. Johnson, Grangeville, Idaho
Filed Oct. 22, 1963, Ser. No. 318,020
8 Claims. (Cl. 272—70.3)

This invention relates to safety brakes for caster wheels, and more particularly to brake mechanisms so constructed that the brake is automatically applied to the wheel when downward force is exerted on the movable support or article to which the caster wheel is attached.

In its broader aspects, the invention is applicable to storage racks, tables, and other supports or articles of furniture, and in this case the downward force is exerted by a load placed on the article, or by the weight of a person occupying the piece of furniture.

The invention is especially useful, however, when applied to so-called invalid walkers, or walking aids for use by unsteady victims of afflictions which affect balance, mobility, etc.

The general object of the invention is to provide an improved arrangement of brake mechanism for caster wheels, so designed that the brake is applied by downward force exerted on the movable article which is supported on the caster wheels.

Another object is to so design my improved caster wheel unit and brake that it may be applied to the legs of many types of existing articles of furniture and invalid walkers.

Yet another object of the invention is to provide means for locking the brake on, so as to hold the article stationary, and for locking the brake off, when desired, so that the article may roll freely under all conditions.

When used in connection with invalid walkers, an important object of the invention is to provide, in combination with a pair of movable hand rails between which the patient may be supported, such hand rails forming part of a frame mounted on caster wheels so designed that they roll only when the user is able to move with the walker.

Also, in connection with invalid walkers, another object is to devise a caster wheel brake unit so constructed that the brake is automatically applied to the wheel when downward pressure is exerted, voluntarily or involuntarily by the patient on the hand rails.

A still further object is to provide means for adjusting the amount of pressure necessary to apply the brake, so as to adapt the device for the use of light, medium, or heavy weight patients.

With the above and other objects in view, and to improve generally on the details of such apparatus, the invention consists in the construction and combination of parts hereinafter described and claimed, and illustrated in the accompanying drawing, forming part of this specification, and in which:

FIG. 1 is a perspective view, on a relatively small scale, showing an invalid walker embodying the invention;

FIG. 2 is a side elevation, on a much larger scale, showing the lower end of one of the legs of an invalid walker or other article with my improved caster wheel unit applied thereto, parts being in section;

FIG. 3 is a vertical section on the line 3—3 of FIG. 2, looking in the direction of the arrows;

FIG. 4 is a transverse section on the line 4—4 of FIG. 3;

FIG. 5 is a fragmentary vertical section on an enlarged scale through a portion of the mounting bushing;

FIG. 6 is a fragmentary vertical section similar to FIG. 3, but showing a slightly modified form of brake shoe; and FIG. 7 is a fragmentary side elevation similar to FIG. 1 but showing a different method of mounting the caster wheel unit on a leg of a walker or other article.

The invention will be described, by way of example, as applied to an invalid walker.

Referring to the drawing in detail, the walker comprises a pair of spaced horizontal hand rails 1, forming part of a frame having four legs 2, each carrying at its lower end a caster wheel 3.

This caster wheel is journaled, as usual in a fork 4, to which is rigidly secured a vertically extending spindle 5. This is shown as a hollow, cylindrical member, having at its lower end adjacent the fork a threaded portion 6. A barrel nut 7, having at its end a radial flange 8, works over the threaded portion 6 of the spindle. In the embodiment shown in FIGS. 2 and 3, this nut is designed so that its outside diameter can be inserted in the lower open end of the tubular walker leg 2, with a snug, slip fit.

The upper end of the spindle 5 extends through and is rotatably supported in a bushing 9, of a size to fit closely within the leg 2, and rigidly secured thereto as by means of screws 10. It will be seen that these screws pass through the wall of the leg and enter "blind" threaded holes 10ᵃ formed in the bushing. It will be particularly noted that, as best shown in FIG. 5, these holes do not extend through the bushing, and thus do not bear against the spindle.

The upper end of the spindle has a circumferential groove 11 cut in it, in which fits a U-shaped lock washer 12, to hold the spindle from downward movement.

Extending through the hollow bore of the spindle and freely slidable therein is a push rod 13, rigidly secured at its lower end to a brake shoe 14, disposed within the fork 4, and having a lower face shaped to fit against the wheel 3. At its upper end, this push rod carries a transversely extending pin 15, which works freely in a longitudinal slot 16 formed in the spindle.

A helical compression spring 17 surrounds the spindle and is confined between the pin 15, at its upper end, and the barrel nut 7, at its lower end. Bearing washers 18 are preferably interposed between the spring and pin 15, and between the spring and the barrel nut 7, a third bearing washer 19 being shown as interposed between the pin 15 and bushing 9.

From the foregoing, it will be seen that the spring, thrusting against the bushing 9, tends to maintain the walker frame in its uppermost position, and bearing against the pin 15, normally serves to hold the brake shoe 14 out of contact with the wheel, but when downward pressure is applied to the hand rails 1 by the patient, either voluntarily or involuntarily, this pressure is transmitted from the bushing 9 to the pin 15, thus compressing the spring, and moving the pin downwardly in the slot 16, thereby bringing the brake shoes 14 into contact with the wheels 3, and preventing the walker from rolling. When this pressure is withdrawn, the springs lift the brake shoes off of the wheels.

The amount of pressure necessary to apply the brake shoes can be adjusted by changing the degree of compression of the springs by means of the barrel nuts 7. This makes it possible to adapt the apparatus for patients of different weights, or having different requirements.

In order to lock the brake shoes in "on" position, so as to hold the walker stationary, or in "off" position, so that the walker becomes a free-wheeling unit, I form in the sides of the brake shoes vertically spaced indentations or sockets, 14ᵃ and 14ᵇ, as shown in FIG. 3, and provide a pair of thumb screws 20 and 21, working through the fork 14, and arranged to selectively engage these sockets.

It will be particularly noted that these sockets are spaced vertically apart a relatively short distance, this distance corresponding with the limits of movement of the brake shoe. As shown in FIG. 2, this movement is very small, and this is highly advantageous in giving a quick response to any loss of balance by the patient. It results in an article which is almost as steady as a stationary support, and yet which can roll freely when the patient relaxes the pressure on the hand rails.

In the case of heavy work tables or supporting racks for industrial use, I provide a pair of sockets in vertical alinement, and spaced much further apart, as shown in FIG. 6, and employ only a single set screw 21 for selectively engaging these sockets.

In case the legs of the article are not tubular, or for any other reason it would be difficult or impossible to insert the spindle and associated parts into them, as described in connection with FIGS. 2 and 3, I may secure these parts to the outside of the leg, as illustrated in FIG. 7. In this case I provide a bracket 22, having split collars 23 and 24, adapted to clamp around the leg, and collars 25 and 26 suitably constructed to support the spindle. As shown, the upper collar 25 takes the place of the bushing 9, and the lower collar 26 is of such size as to snugly receive the barrel nut 7.

What I claim is:

1. A caster wheel unit constructed to be attached to a leg of a movable support, or the like, said unit comprising a fork in which the wheel is journaled, a brake shoe positioned within said fork and arranged to bear against said wheel, a spindle rigid with and extending upwardly from said fork, means for rotatively securing said spindle to the leg in such manner that said fork may swivel freely, means for connecting the leg and spindle so that the leg may move upwardly and downwardly with respect to said spindle, spring means urging said leg to its uppermost position with said brake shoe out of engagement with said wheel, and means interconnecting said brake shoe and leg by which downward movement of said leg serves to bring said brake shoe into engagement with said wheel.

2. A caster wheel unit in accordance with claim 1 in which the spring means is a helical compression spring surrounding said spindle.

3. A caster wheel unit in accordance with claim 1 in which said spindle is hollow, in which the last recited means includes a push rod carried by said brake shoe extends upwardly through said hollow spindle, and in which connecting means are provided between said rod and leg so that said rod moves downwardly with said leg, while said spindle remains stationary.

4. A caster wheel unit in accordance with claim 3 in which the connecting means between said rod and leg comprises a transversely extending pin carried by said rod and working through slots formed in said hollow spindle, and means rigid with said leg engaging said pin.

5. A caster wheel unit in accordance with claim 2 in which a barrel nut, having at its lower end a radial flange, is threaded over the lower end of said spindle, and in which said compression spring is confined between said nut and said pin.

6. A caster wheel unit in accordance with claim 1, in which the leg is tubular, in which said spindle and spring means is inserted into the open end of such tubular leg, and in which the means for securing said spindle in place comprises a bushing secured inside of such tubular leg in which bushing said spindle is journaled.

7. A caster wheel unit in accordance with claim 1 in which the means for securing said spindle to the leg comprises a bracket constructed to be clamped to the outside of said leg and carrying means in which said spindle is journaled.

8. An invalid walker comprising a rigid frame including a pair of spaced, fixed, horizontal hand rails, the space between them inside the frame being open and unobstructed, to accommodate the occupant in standing position, caster wheels on which said frame is mounted, a brake shoe arranged to bear against each caster wheel, and means interconnecting said frame and brake shoe whereby downward pressure on said hand rails serves to apply said brake shoes to said wheels.

References Cited by the Examiner
UNITED STATES PATENTS

| | | | |
|---|---|---|---|
| 583,728 | 6/1897 | Brow | 188—265 X |
| 2,214,176 | 9/1940 | Portle. | |
| 2,437,778 | 3/1948 | Ames. | |
| 2,630,961 | 3/1953 | Burg | 188—265 |
| 2,684,734 | 7/1954 | Wilson | 188—74 |
| 2,942,698 | 6/1960 | Bolinger | 188—176 |
| 2,950,121 | 8/1960 | Fisher | 188—29 X |
| 3,057,638 | 10/1962 | Floyd | 188—29 X |

MILTON BUCHLER, *Primary Examiner.*

DUANE A. REGER, ARTHUR L. LA POINT,
*Examiners.*